F. E. VANDERCOOK.
MACHINE FOR POINTING PINS.
APPLICATION FILED JAN. 23, 1915.
1,150,157.
Patented Aug. 17, 1915.
4 SHEETS—SHEET 1.
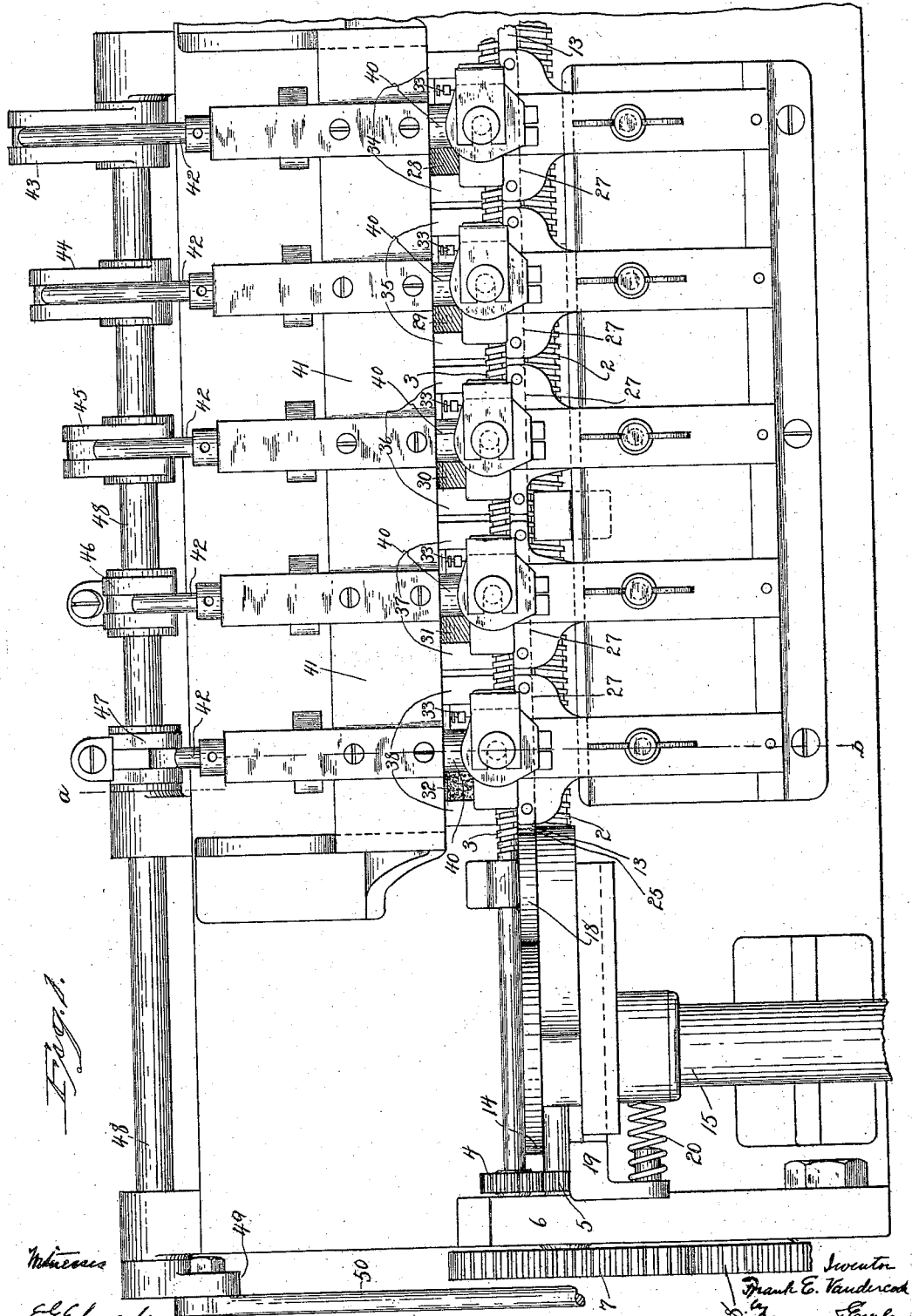

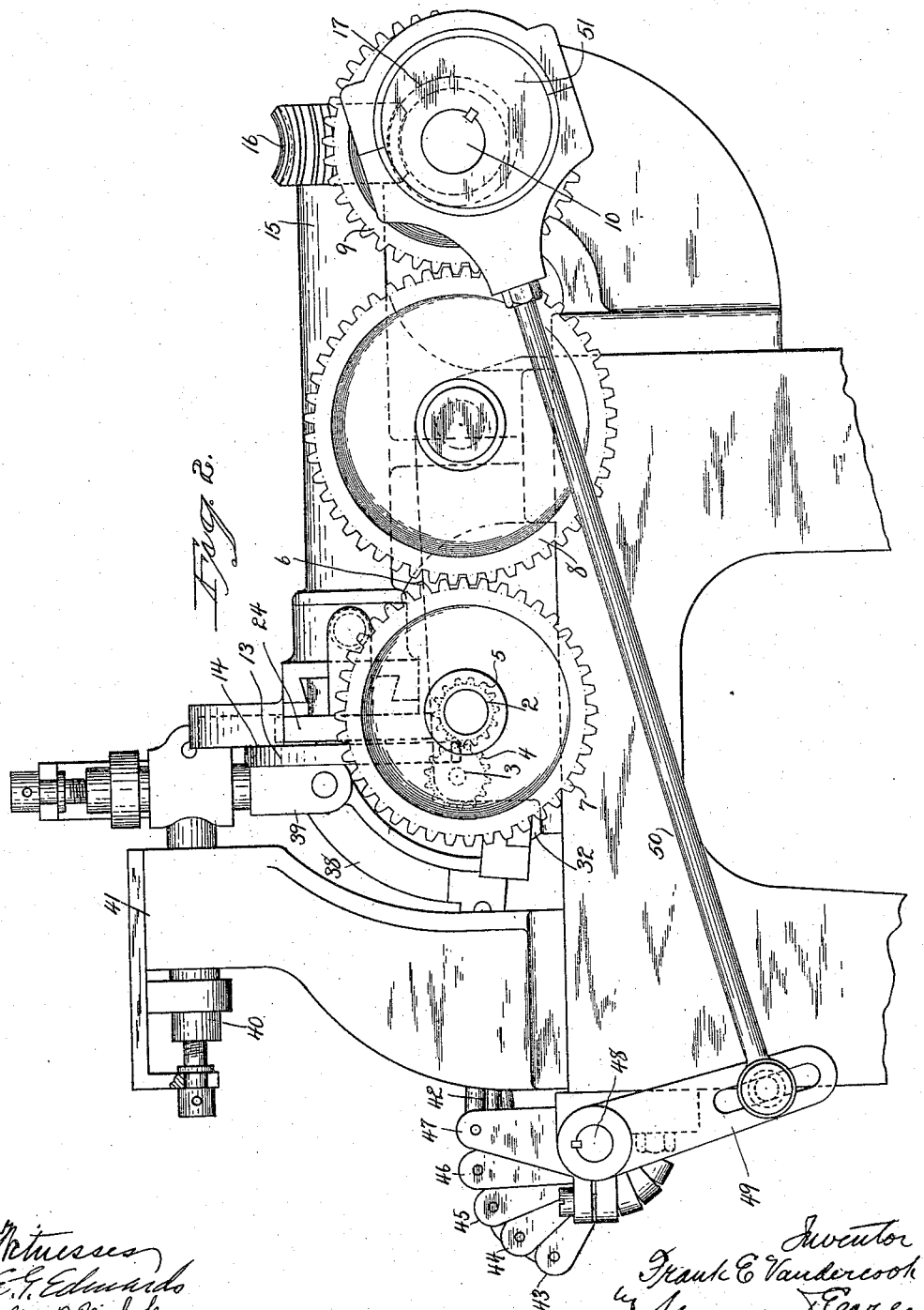

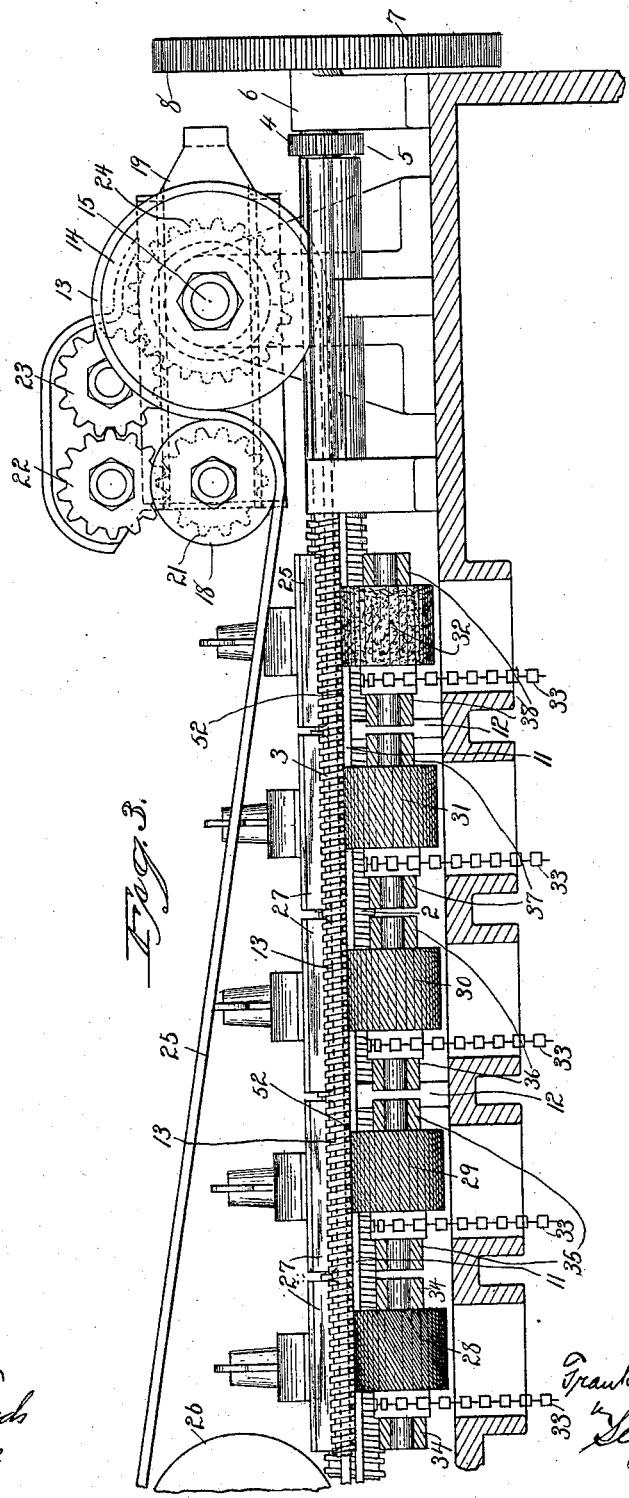

F. E. VANDERCOOK.
MACHINE FOR POINTING PINS.
APPLICATION FILED JAN. 23, 1915.
1,150,157.
Patented Aug. 17, 1915.
4 SHEETS—SHEET 4.
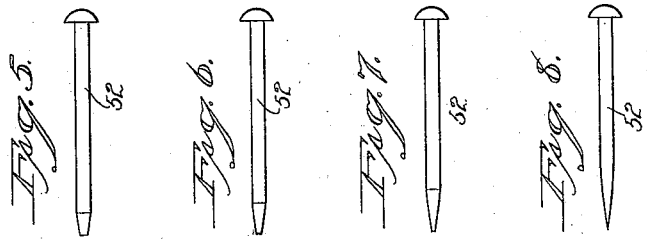
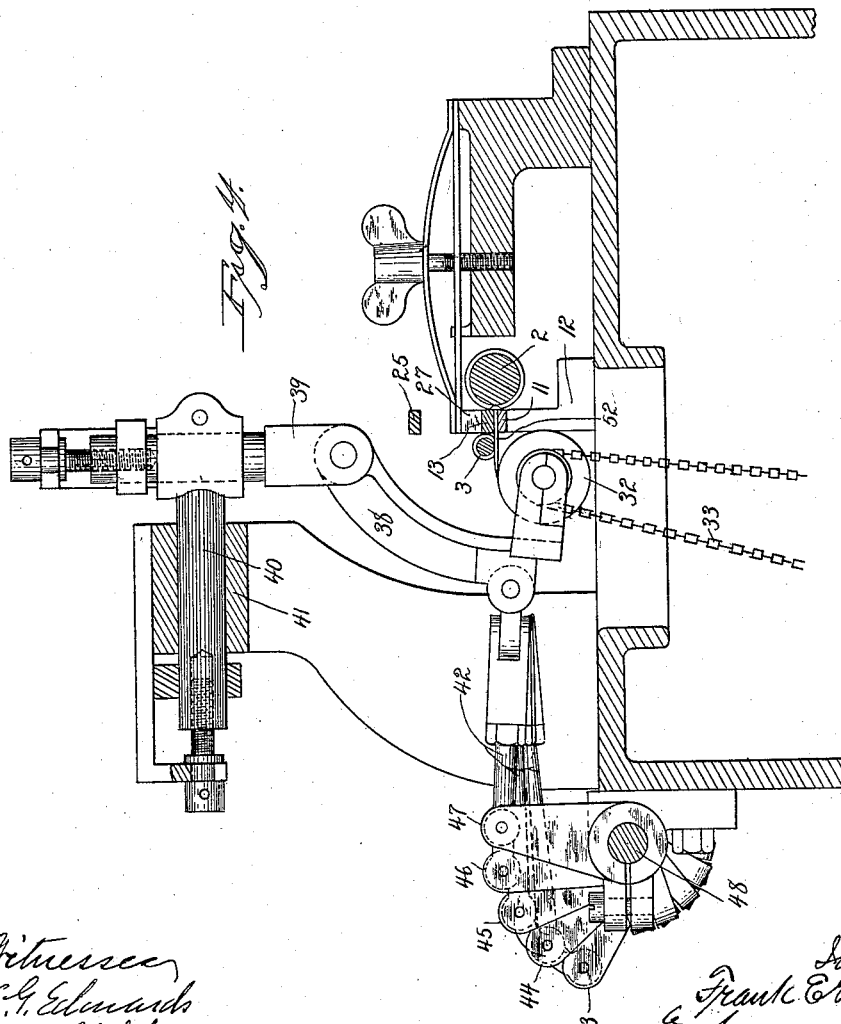

UNITED STATES PATENT OFFICE.

FRANK E. VANDERCOOK, OF WATERBURY, CONNECTICUT, ASSIGNOR TO THE STAR PIN CO., OF HUNTINGTON, CONNECTICUT, A CORPORATION.

MACHINE FOR POINTING PINS.

1,150,157. Specification of Letters Patent. Patented Aug. 17, 1915.

Application filed January 23, 1915. Serial No. 3,910.

*To all whom it may concern:*

Be it known that I, FRANK E. VANDERCOOK, a citizen of the United States, residing at Waterbury, in the county of New Haven and State of Connecticut, have invented a new and useful Improvement in Machines for Pointing Pins; and I do hereby declare the following, when taken in connection with the accompanying drawings and the characters of reference marked thereon, to be a full, clear, and exact description of the same, and which said drawings constitute part of this application, and represent, in—

Figure 1 a top or plan view of a machine for pointing pins constructed in accordance with my invention. Fig. 2 a broken view in side elevation showing the driving mechanism. Fig. 3 a broken longitudinal sectional view. Fig. 4 a sectional view on the line a—b of Fig. 1. Figs. 5, 6, 7 and 8 illustrate pins in various stages of manufacture.

This invention relates to an improvement in pin machines, and particularly to means for pointing and finishing the pins, the object being to provide a mechanism by which the pins are given an arcuate point and by which pins can be more rapidly produced; and the invention consists in the construction hereinafter described and particularly recited in the claims.

In carrying out my invention I employ the usual feed screws 2 and 3 both of the same pitch, and arranged parallel, the screw 2 being of larger diameter than the screw 3. These screws are provided with meshing gears 4 and 5, and screw 2 projects through the frame 6, and carries at its outer end a gear 7 meshing with an intermediate idle gear 8 which is driven by a gear 9 on the driving shaft 10. Between the screws is a bar or table 11 which is supported at intervals by brackets 12. Above this table is one reach of an endless belt 13, this belt being driven by a pulley 14 turned by a shaft 15 having a worm gear 16 meshing with a worm 17 on the shaft 10. The belt is held in contact with this pulley by a presser roll 18 which is mounted in a slide 19 which is drawn toward the pulley 14 by the action of a spring 20. To drive the presser roll 18 it is provided with a gear 21 meshing with an idler 22 which in turn meshes with an idler 23 driven by a gear 24 fixed to the shaft 15 and turning with the pulley 14. From the presser roll 18 the upper reach 25 of the belt extends over a spring-actuated idler 26 by which tension on the belt is maintained. At intervals along the lower reach 13 of the belt are spring pressed blocks 27 herein shown as five in number, and in line with these blocks and on opposite sides of the belt are a series of grinders 28, 29, 30 and 31, and polishing wheel 32, these grinders and polishing wheels being driven by sprocket chains 33 driven from any convenient point; and I may here state that instead of having four grinders and one polisher, the number of grinders may be reduced and additional polishing wheels substituted therefor as may be necessary or desirable. These grinding and polishing wheels are respectively mounted in swinging arms 34, 35, 36, 37 and 38, and these arms are mounted in vertically adjustable heads 39 so as to be permitted a swinging or oscillating motion toward and from the belt. The heads are also transversely adjustable by means of longitudinally extensible rods 40 mounted in a bridge 41 supported by the frame.

The several arms 34, 35, 36, 37 and 38 are respectively connected by adjustable links 42 with rock arms 43, 44, 45, 46 and 47 mounted on a rock shaft 48 which carries a crank 49 engaged by a pitman 50 with a head 51 eccentrically mounted on a driving shaft 10. These rock arms are set at different points from the center so as to each have a different extent of movement and so as to reciprocate the grinders which are constantly at work on pins 52 carried and rotated by the belt. The pins 52 are fed in the usual way between the belt and the table bar 11, the heads entering grooves in the screw 2 and the shanks entering the groove in the screw 3 by which they are advanced from one end of the machine to the other. As the pins are passing the grinding roll 28, that roll is successively swung inward and outward and so as to initially cut the point, as indicated in Fig. 5. As the pins pass the grinder 29, owing to the length of connection between the rock-arm and the bracket, the throw of the arm 35 will be slightly greater so that the grinder 29 has a greater movement than did the grinder 28 so as to further point the pin, as indicated in Fig. 6. The grinder 30 has a corresponding longer throw and further points the pin as indicated in Fig. 7 and the grinder 31 having a greater throw, completes the point as shown in Fig. 8 of the drawings; and the polishing roll 32 completes the operation by polishing the point without materially removing any stock. By thus controlling the throw of the grinders and moving them on an arc of a circle rather than by reciprocating motion, the pins are ground on arcs of a circle thus producing a perfect point. The length of cut produced by any one of the cutters is determined by the vertical adjustment of the bracket carrying the grinder.

I claim:—

1. In a machine for pointing pins, the combination with a carrier, of means for revolving the pins in said carrier, a plurality of oscillating rotary cutters adapted to be automatically brought into contact with the points of the pins while held by the said carrier.

2. In a machine for pointing pins, the combination with a carrier, of means for revolving the pins in said carrier, a plurality of oscillating rotary cutters, and means for automatically moving them in an arc toward and from the carrier into contact with the points of the pins while held by said carrier.

3. In a machine for pointing pins, the combination with a carrier, of means for revolving the pins in said carrier, a plurality of grinders adapted to be moved in an arc toward and from the carrier, means for rotating the grinders, a rock shaft, rock arms on said shaft, and connections between the rock arms and the grinders whereby they are automatically oscillated at different degrees to bring the grinders into contact with the points of the pins held by the said carrier.

4. In a machine for pointing pins, the combination with a carrier, of means for revolving the pins held by said carrier, a series of grinders, means for rotating the grinders, arms in which said grinders are supported, means for adjustably and longitudinally moving said arms, and automatic means for moving said grinders toward and from the carrier to point the pins carried thereby.

5. In a machine for pointing pins, the combination with a carrier and means for rotating pins thereon, of a series of grinders, arms in which said grinders are mounted, vertically and longitudinally adjustable supports for said arms, a rock shaft, and means for rocking the same, a series of rock arms connected with said rock shaft and set at different points from the center, and connections of varying length between the rock shaft and said grinder arms, whereby the grinders are brought into contact with the points of the pins while held by said carrier.

In testimony whereof, I have signed this specification in the presence of two subscribing witnesses.

FRANK E. VANDERCOOK.

Witnesses:
GEORGE W. MITCHELL,
EDWARD L. SEERY.

Copies of this patent may be obtained for five cents each, by addressing the "Commissioner of Patents Washington, D. C."